United States Patent
Peck et al.

(10) Patent No.: US 11,308,372 B1
(45) Date of Patent: Apr. 19, 2022

(54) EFFICIENT SHEET MAP LOADING FOR PRINT JOBS

(71) Applicants: Dakota Peck, Boulder, CO (US); Katie Ashley Eng, Boulder, CO (US); David Ward, Broomfield, CO (US)

(72) Inventors: Dakota Peck, Boulder, CO (US); Katie Ashley Eng, Boulder, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/220,911

(22) Filed: Apr. 1, 2021

(51) Int. Cl.
  *G06K 15/02* (2006.01)
  *G06F 3/12* (2006.01)
  *G06N 20/00* (2019.01)

(52) U.S. Cl.
  CPC ....... *G06K 15/1806* (2013.01); *G06F 3/1205* (2013.01); *G06F 3/1252* (2013.01); *G06F 3/1257* (2013.01); *G06K 15/1823* (2013.01); *G06K 15/1836* (2013.01); *G06N 20/00* (2019.01)

(58) Field of Classification Search
  CPC .... G06F 3/1215; G06F 3/1217; G06F 3/1205; G06F 3/1252; G06F 3/1257; G06K 15/1806; G06K 15/1823; G06K 15/1861; G06K 15/1836; G06N 20/00
  USPC ...................................... 358/1.13, 1.15–1.18
  See application file for complete search history.

(56) References Cited

U.S. PATENT DOCUMENTS

| | | | |
|---|---|---|---|
| 7,333,246 B1 | 2/2008 | Kowalski et al. | |
| 10,241,732 B2 | 3/2019 | Eng et al. | |
| 2009/0296132 A1 | 12/2009 | Frank | |
| 2011/0188060 A1* | 8/2011 | Voss | B41J 13/0027 358/1.9 |
| 2020/0233615 A1 | 7/2020 | Hirata | |
| 2020/0310700 A1 | 10/2020 | Nishida | |

OTHER PUBLICATIONS

Kerry Stevenson; Dialing in 3D Printing Parameters With Machine Learning; https://www.fabbaloo.com; Nov. 26, 2020.

* cited by examiner

*Primary Examiner* — Kent Yip
(74) *Attorney, Agent, or Firm* — Duft & Bornsen, PC

(57) ABSTRACT

System and methods for efficient sheet map loading for print jobs. In one embodiment, a preflight system processes a print job to build a first sheet mapping for rasterizing and printing the print job, and stores the first sheet mapping. A job controller determines an estimate time to load the first sheet mapping from the memory using job properties as input to estimator logic. In response to determining that the estimate time for loading the first sheet mapping from the memory is shorter than a time threshold, the first sheet mapping is loaded from memory, and provided for rasterizing and printing. Otherwise, if the estimate time is longer than the time threshold, the job controller builds a second sheet mapping, and provides the second sheet mapping in increments for the rasterizing and the printing of the print job as the building of the second sheet mapping is in progress.

20 Claims, 4 Drawing Sheets

EFFICIENT SHEET MAP LOADING FOR PRINT JOBS

FIELD OF THE INVENTION

The invention relates to the field of printing systems, and in particular, to loading sheet mapping data for a print job.

BACKGROUND

A print system capable of handling large print jobs (e.g., hundreds or thousands of documents) includes a print controller that rasterizes the logical pages of the print job into bitmap images. The bitmap images are used by a print engine to physically mark print media to print the print job. Prior to rasterizing and printing, a preflight process is performed on the print job to determine a sheet mapping, and store the sheet mapping in memory. Downstream print functions such as preview, rasterization, and printing of the print job are performed by referencing the sheet mapping in memory. However, for some print jobs, it takes a long time to load the sheet mapping from memory, causing interruption to printing.

SUMMARY

Embodiments described herein provide for efficient sheet map loading for print jobs. A preflight system processes a print job to build a sheet mapping. A job controller is enhanced with logic configured to determine whether it is more efficient to load the sheet mapping from memory or instead to begin building a new sheet mapping "on-the-fly" so that information from the sheet mapping can be incrementally provided for rasterizing and printing.

One embodiment is an apparatus that includes an interface configured to receive a print job, and a preflight system configured to process the print job to build a first sheet mapping for rasterizing and printing the print job, and to store the first sheet mapping in memory. The apparatus also includes a job controller configured to process the print job to extract one or more job properties, and to apply the one or more job properties as input to estimator logic to determine an estimate time to load the first sheet mapping from the memory. The job controller is configured, in response to determining that the estimate time for loading the first sheet mapping from the memory is shorter than a time threshold, to load the first sheet mapping from the memory, and to provide the first sheet mapping for the rasterizing and the printing of the print job. The job controller is further configured, in response to determining that the estimate time for loading the first sheet mapping from the memory is longer than the time threshold, to initiate building a second sheet mapping for the print job, and to provide the second sheet mapping in increments for the rasterizing and the printing of the print job as the building of the second sheet mapping is in progress.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
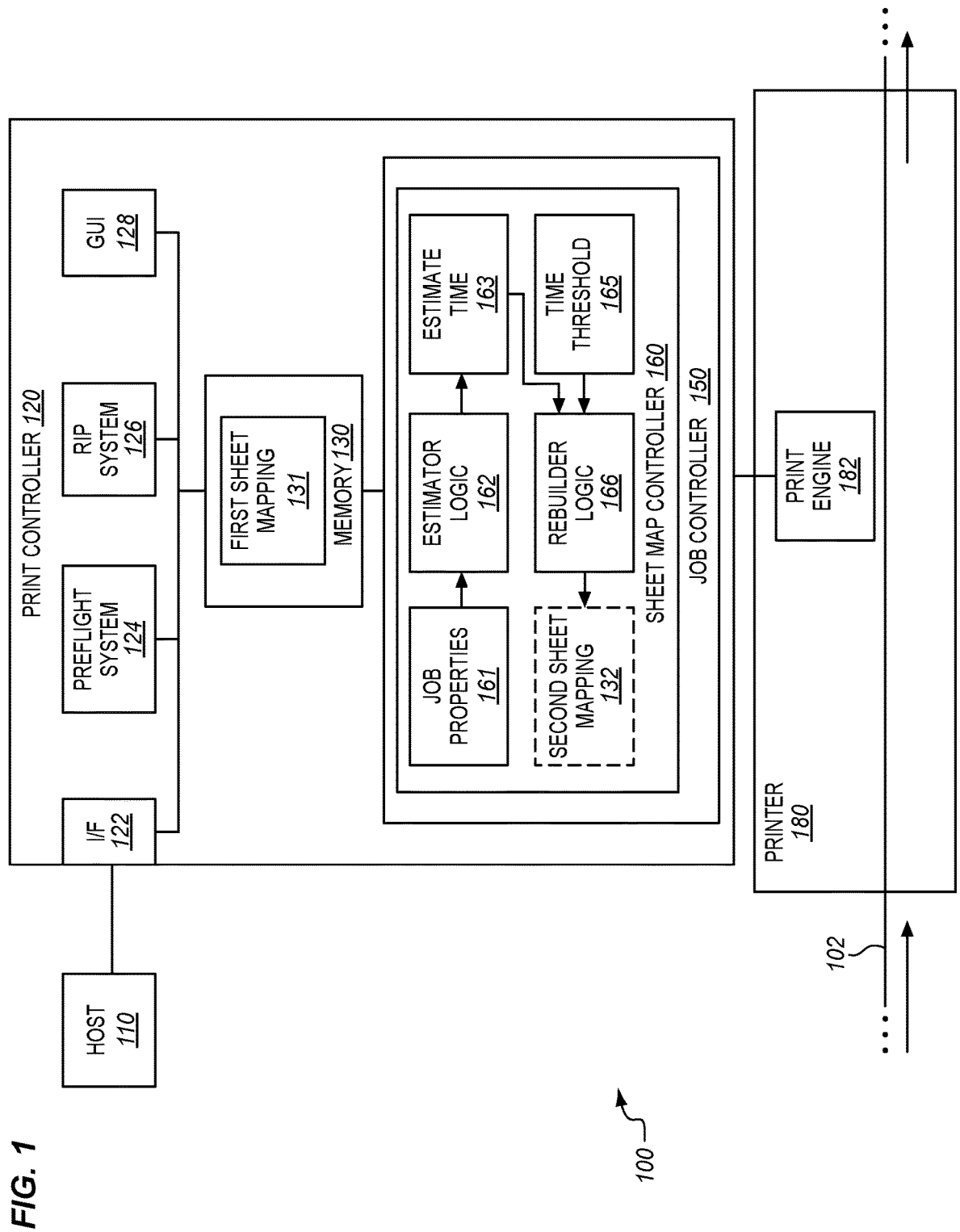
FIG. 1 is a block diagram of a print system in an illustrative embodiment.

FIG. 1 is a block diagram of a print system 100 in an illustrative embodiment. The print system 100 includes one or more host(s) 110, print controller(s) 120, and printer(s) 180 that may interact to carry out any number of high-volume printing applications, such as mass-mail printing of time sensitive statements and bills. In general, a host 110 generates and submits print job(s) to a print controller 120 which prepares the print jobs and schedules them with a printer 180 under its control. The printer 180 may include a production printer capable of high volume printing and may include a print engine 182 to physically transform the print job onto a printable medium 102, such as a paper web.

The print controller 120 may include an interface 122 (e.g., an Ethernet interface, wireless interface, etc.) that receives a print job and a job ticket from the host 110. The print controller 120 may further include a preflight system 124 operable to collect job information, and a Raster Image Processor (RIP) system 126 operable to interpret, assemble, render, rasterize, or otherwise convert raw sheet sides for a print job into sheet side bitmaps. A graphical user interface (GUI) 128 may also be provided for user input and manipulation of print data at the print controller 120. The print controller 120 also includes memory 130 (e.g., random access memory (RAM) or other suitable forms of data storage) to store the print job and the job ticket. A job controller 150 coordinates the overall operation of the print controller 120 to transform raw print data into a series of rasterized images for a print engine 182. The particular arrangement, number, and configuration of components discussed herein are examples for purposes of discussion.

Typically, the preflight system 124 performs a preflight process on incoming print jobs which involves analyzing a print job and its job ticket to build a sheet mapping (e.g., first sheet mapping 131) for the print job. The sheet mapping, sometimes referred to as a job model, captures the relationships of the logical pages to sheet sides for the print job and includes the logical page order and placement. The sheet mapping thus includes print job characteristics which enable the print engine 182 to correctly produce the desired printed output. Example information in the sheet mapping includes which logical pages of the print job belong to which sheets of the print media, the type of paper to be printed on, whether to print in simplex or duplex, and the layout or imposition data for the job. The preflight system 124 may store the processed characteristics as a first sheet mapping 131 in memory 130 so that the data is available to downstream components for previewing, rasterizing, and printing the print job.

Unfortunately, for some print jobs, the time to load the first sheet mapping 131 from memory 130 is unacceptably long. For example, a Portable Document Format/Variable Transactional (PDF/VT) print job which includes many records and many changes in media mid-job may result in a long pause before printing begins. The job controller 150 waits for the entirety of the first sheet mapping 131 to load from memory 130 before it can begin sending rasterized pages to the print engine 182 for printing.

The job controller 150 is therefore enhanced with a sheet map controller 160 configured to determine whether it is preferable to load the first sheet mapping 131 from memory 130 or to instead rebuild it from scratch. Although rebuilding from scratch involves re-processing the print job to determine sheet mapping information already determined by the preflight system 124, in some situations it is faster than loading the first sheet mapping 131 from memory 130 because it can begin sending the sheet mapping information incrementally as it is determined rather than waiting for it to load in its entirety.

The sheet map controller 160 includes estimator logic 162 configured to determine an estimate time 163 for loading the first sheet mapping 131 from memory 130. The estimator logic 162 uses one or more job properties 161 as input. Examples of job properties 161 include a number of pages in the print job and/or a number of records (e.g., groups of pages that share a common field) in the print job. The sheet map controller 160 also includes rebuilder logic 166 configured to determine whether to rebuild the sheet mapping based on a comparison of the estimate time 163 and a time threshold 165. The time threshold 165 may be a user input value or programmable value representing a maximum period of time that is acceptable to wait for loading the first sheet mapping 131 from memory 130.

If the estimate time 163 for loading the first sheet mapping 131 is sufficiently short (i.e., lower than time threshold 165), the rebuilder logic 166 determines to load the first sheet mapping 131 from memory 130, making the first sheet mapping 131 available for using in previewing, rasterizing, and printing. On the other hand, if the estimate time 163 for loading is longer than the time threshold 165, the rebuilder logic 166 determines to build a second sheet mapping 132 and begins building the second sheet mapping 132 so that it can be made available for previewing, rasterizing, and/or printing as it is built in increments. The sheet map controller 160 thus advantageously determines whether to make the first sheet mapping 131 or second sheet mapping 132 available to the components of the print system 100 based on which processing path is more time efficient for the print job. Additionally, as will be described in greater detail below, the estimator logic 162 may be refined over time to adapt to the customer's use of the print system 100 to improve its estimation capability.

Figure 2:
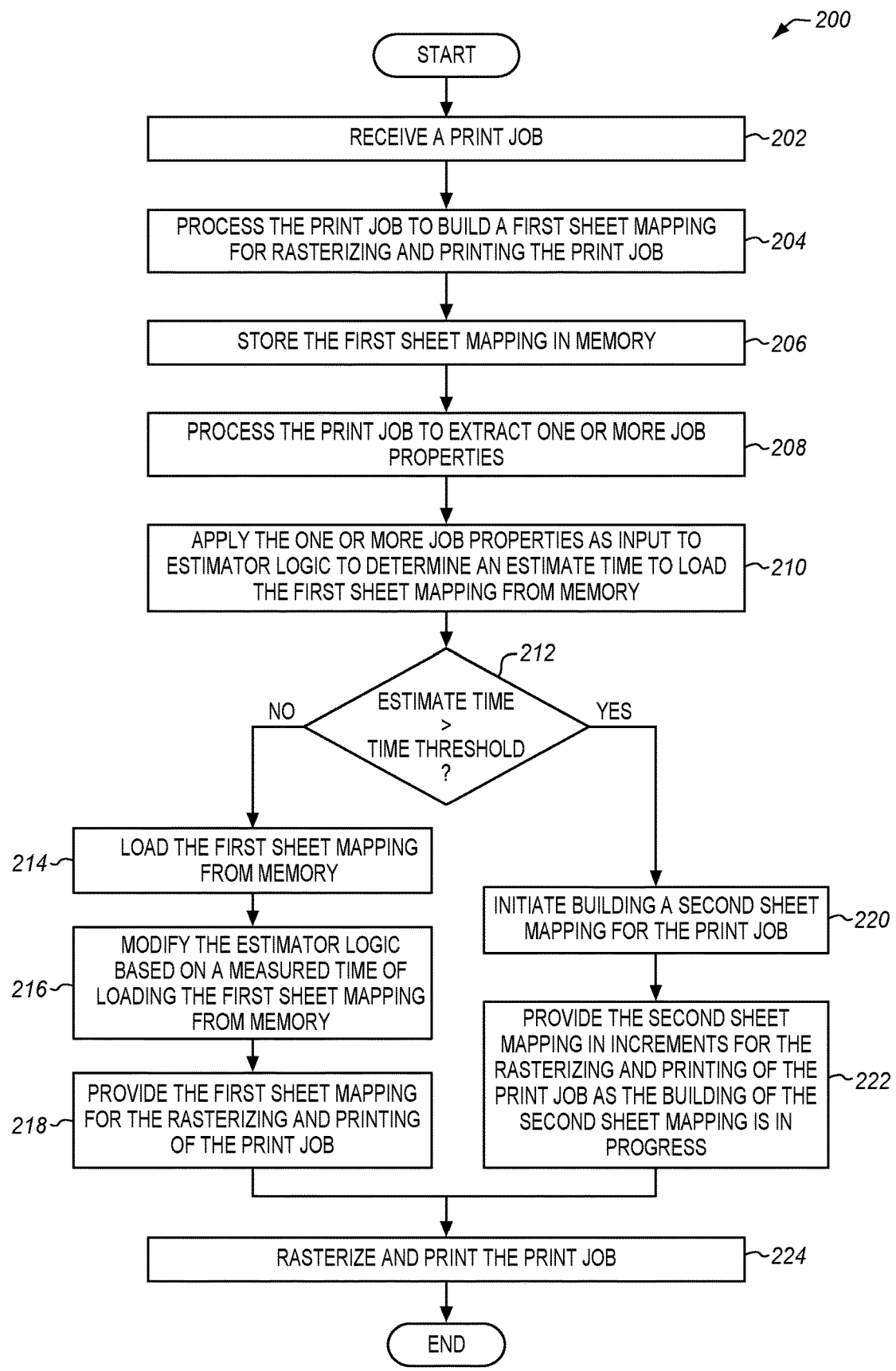
FIG. 2 is a flow chart illustrating a method of obtaining sheet mapping information for a print job in an illustrative embodiment.

FIG. 2 is a flow chart illustrating a method 200 of obtaining sheet mapping information for a print job in an illustrative embodiment. The steps of the method 200 will be described with respect to the print system 100 of FIG. 1, though it will be appreciated that the steps may be performed in other systems, may include other steps not shown, and may be performed in an alternate order.

At step 202, the interface 122 of the print controller 120 receives a print job. The print job may include raw print data in any format (e.g., Page Description Language (PDL), Printer Control Language (PCL), PostScript data, etc.) and may specify a particular print attribute for its pages. The print job may be accompanied by a job ticket which is any data or file (e.g., Job Definition Format (JDF), .csv extension file, etc.) that includes definitions or instructions for how the print job is to be processed. For example, the job ticket may include attribute information for the type of media to use (e.g., A4, media bin, color, etc.), the size and/or formatting of pages on the media (e.g., duplex, N-up configurations, image/text alignment), the type of finishing, etc. The print job and job ticket may be stored in memory or a raw job spool for being processed.

In step 204, the preflight system 124 processes the print job to build a first sheet mapping 131 for rasterizing and printing the print job. The preflight system 124 may analyze both the print job and the job ticket to determine the first sheet mapping 131. In step 206, the preflight system 124 stores the first sheet mapping 131 in memory 130. In step 208, the job controller 150 processes the print job to extract one or more job properties. In step 210, the job controller 150 applies the one or more job properties as input to estimator logic to determine an estimate time 163 to load the first sheet mapping 131 from memory 130.

In step 212, the job controller 150 determines whether the estimate time 163 is greater than the time threshold 165. If the estimate time 163 is shorter than the time threshold 165 (i.e., No in step 212), the job controller 150 loads the first sheet mapping 131 from memory 130 (in step 214), modifies the estimator logic based on a measured time of loading the first sheet mapping 131 from memory 130 (step 216), and provides the first sheet mapping 131 for the rasterizing and printing of the print job (in step 218). Otherwise, if the estimate time 163 is longer than the time threshold 165 (i.e., Yes in step 212), the job controller 150 initiates building a second sheet mapping 132 for the print job (in step 220), and provides the second sheet mapping in increments for the rasterizing and the printing of the print job as the building of the second sheet mapping is in progress (in step 222).

In step 224, the print job is rasterized and printed using one of the first sheet mapping 131 and the second sheet mapping 132. Accordingly, the method 200 provides a technical benefit over prior techniques by determining whether, for any particular print job, it is more efficient to load the first sheet mapping 131 from memory 130 or instead to begin building a second sheet mapping 132 that can be made available in increments as it is built. Furthermore, the estimator logic 162 may automatically adapt to the print system 100 over time as print jobs are processed as described in greater detail below.

Figure 3:
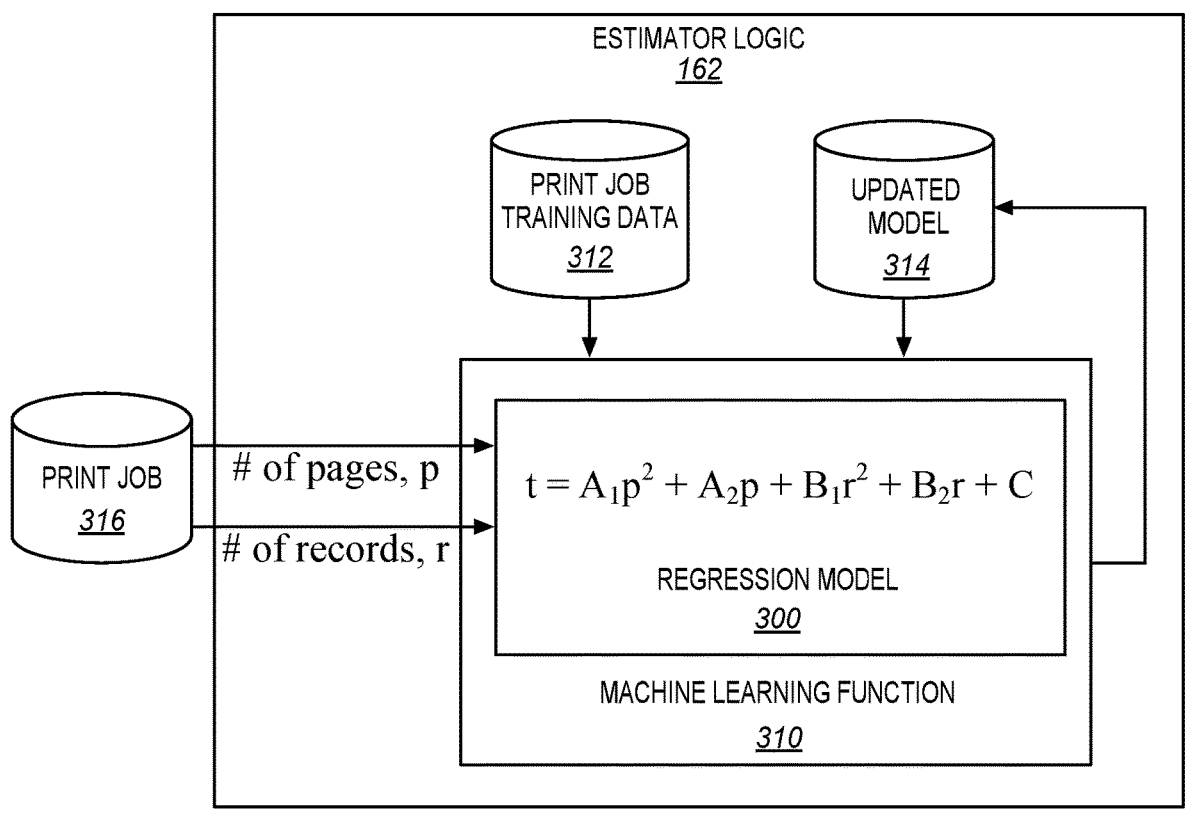
FIG. 3 is a diagram of estimator logic using a regression model to estimate times for loading sheet mapping in an illustrative embodiment.

FIG. 3 is a diagram of estimator logic 162 using a regression model 300 to estimate times for loading sheet mapping in an illustrative embodiment. The regression model 300 may be implemented by a machine learning function 310 that receives print job training data 312 as input and generates an updated model 314 for the regression model 300 as output. Accordingly, in response to loading the first sheet mapping 131 from memory 130, the job controller 150 (not shown in FIG. 3) is configured to determine a measured time of loading the first sheet mapping 131 from memory 130, and to modify the regression model 300 (or estimator logic 162) based on the measured time to refine its accuracy in estimating sheet mapping load times. Additionally, the job controller 150 configured to modify the regression model 300 using machine learning to adapt coefficients of the regression model 300 based on previously printed print jobs.

In one embodiment, the regression model 300 implements an equation:

$$t = A_1 p^2 + A_2 p + B_1 r^2 + B_2 r + C, \quad \text{Equation (1):}$$

where p is the number of pages in a print job 316, r is the number of records in the print job 316, $A_1$, $A_2$, $B_1$, and $B_2$ are coefficients calculated via regression, C is a constant, and t is the time in seconds to load a sheet mapping from memory.

Accordingly, the coefficients of the regression model 300 multiply one or more job properties (e.g., number of pages in the print job 316 and/or number of records in the print job 316) to determine the estimate time for loading the first sheet mapping 131 from memory 130. The regression model 300 thus outputs the estimate time to load the first sheet mapping 131 from memory 130 based on the particular job properties of the print job 316.

Figure 4:
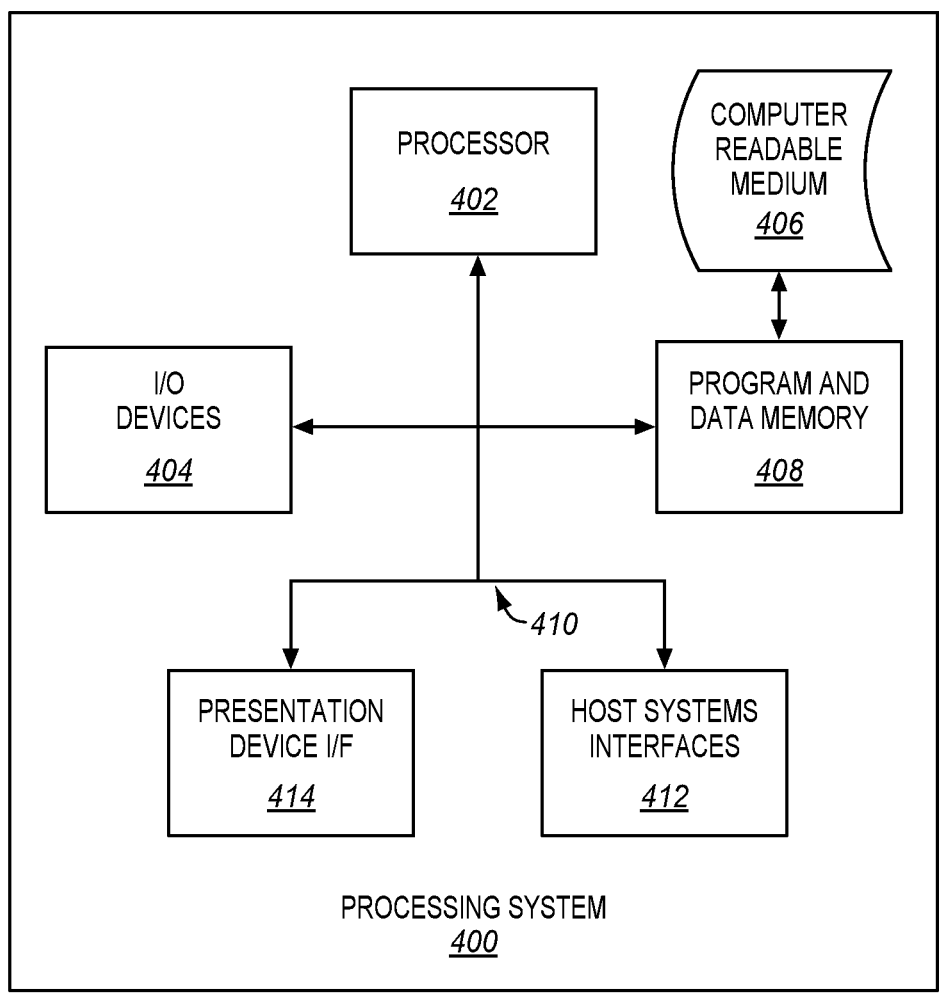
FIG. 4 illustrates a processing system operable to execute a computer readable medium embodying programmed instructions to perform desired functions in an illustrative embodiment.

The print controller 120 and related components such as the job controller 150, may perform the operations and functions described herein by executing one or more sequences of instructions stored on a machine/computer readable medium. FIG. 4 illustrates a processing system 400 configured to execute a computer readable medium embodying programmed instructions to perform desired functions in an illustrative embodiment. Processing system 400 is configured to perform the above operations by executing programmed instructions tangibly embodied on computer readable medium 406. In this regard, embodiments can take the form of a computer program accessible via computer readable medium 406 providing program code for use by a computer or any other instruction execution system. For the purposes of this description, computer readable medium 406 may be anything that contains or stores the program for use by the computer.

Computer readable medium 406 can be an electronic, magnetic, optical, electromagnetic, infrared, or semiconductor device. Examples of computer readable medium 406 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Processing system 400, being suitable for storing and/or executing the program code, includes at least one processor 402 coupled to program and data memory 408 through a system bus 410. Program and data memory 408 may include local memory employed during actual execution of the program code, bulk storage, and cache memories that provide temporary storage of at least some program code and/or data in order to reduce the number of times the code and/or data are retrieved from bulk storage during execution.

Input/output or I/O devices 404 (including but not limited to keyboards, displays, pointing devices, etc.) may be coupled either directly or through intervening I/O controllers. Host system interfaces 412 may also be integrated with the system to enable processing system 400 to become coupled to other data processing systems or storage devices through intervening private or public networks. Modems, cable modems, SCSI, Fibre Channel, and Ethernet cards are just a few of the currently available types of network or host interface adapters. Presentation device interface 414 may be integrated with the system to interface to one or more presentation devices, such as printing systems and displays for presentation of presentation data generated by processor 402. Although specific embodiments were described herein, the scope of the inventive concept(s) is not limited to those specific embodiments. The scope of the inventive concept(s) is defined by the following claims and any equivalents thereof.

What is claimed is:

1. An apparatus comprising:
an interface configured to receive a print job;
a preflight system configured to process the print job to build a first sheet mapping for rasterizing and printing the print job, and to store the first sheet mapping in memory; and
a job controller comprising estimator logic and configured to process the print job to extract one or more job properties, and to apply the one or more job properties as input to the estimator logic to determine an estimate time to load the first sheet mapping from the memory,
the job controller configured, in response to determining that the estimate time for loading the first sheet mapping from the memory is shorter than a time threshold, to load the first sheet mapping from the memory, and to provide the first sheet mapping for the rasterizing and the printing of the print job, and
the job controller configured, in response to determining that the estimate time for loading the first sheet mapping from the memory is longer than the time threshold, to initiate building a second sheet mapping for the print job, and to provide the second sheet mapping in increments for the rasterizing and the printing of the print job as the building of the second sheet mapping is in progress.

2. The apparatus of claim 1 wherein:
the job controller configured, in response to loading the first sheet mapping from the memory, to determine a measured time of loading the first sheet mapping from the memory, and to modify a regression model of the estimator logic based on the measured time to refine accuracy of the estimator logic in estimating sheet mapping load times.

3. The apparatus of claim 2 wherein:
the job controller configured to modify the regression model using machine learning to adapt coefficients of the regression model based on previously printed print jobs.

4. The apparatus of claim 2 wherein:
coefficients of the regression model multiply the one or more job properties to determine the estimate time for loading the first sheet mapping from the memory.

5. The apparatus of claim 2 wherein:
the one or more job properties includes a number of pages in the print job, and
the regression model outputs the estimate time to load the first sheet mapping from the memory based on the number of pages in the print job.

6. The apparatus of claim 2 wherein:
the one or more job properties includes a number of records in the print job, and
the regression model outputs the estimate time to load the first sheet mapping from the memory based on the number of records in the print job.

7. The apparatus of claim 1 further comprising:
a print engine to mark print media based on the print job.

8. A method comprising:
receiving a print job;
processing the print job to build a first sheet mapping for rasterizing and printing the print job, and to store the first sheet mapping in memory;
processing the print job to extract one or more job properties;
applying the one or more job properties as input to estimator logic to determine an estimate time to load the first sheet mapping from the memory;
in response to determining that the estimate time for loading the first sheet mapping from the memory is shorter than a time threshold, loading the first sheet mapping from the memory, and providing the first sheet mapping for the rasterizing and the printing of the print job; and
in response to determining that the estimate time for loading the first sheet mapping from the memory is longer than a time threshold, initiating building a second sheet mapping for the print job, and providing the second sheet mapping in increments for the rasterizing and the printing of the print job as the building of the second sheet mapping is in progress.

9. The method of claim 8 further comprising:
in response to loading the first sheet mapping from the memory, determining a measured time of loading the first sheet mapping from the memory, and modifying a regression model of the estimator logic based on the measured time to refine accuracy of the estimator logic in estimating sheet mapping load times.

10. The method of claim 9 further comprising:
modifying the regression model using machine learning to adapt coefficients of the regression model based on previously printed print jobs.

11. The method of claim 9 wherein:
coefficients of the regression model multiply the one or more job properties to determine the estimate time for loading the first sheet mapping from the memory.

12. The method of claim 9 wherein:
the one or more job properties includes a number of pages in the print job, and
the regression model outputs the estimate time to load the first sheet mapping from the memory based on the number of pages in the print job.

13. The method of claim 9 wherein:
the one or more job properties includes a number of records in the print job, and
the regression model outputs the estimate time to load the first sheet mapping from the memory based on the number of records in the print job.

14. A non-transitory computer readable medium embodying programmed instructions, which, when executed by a processor, are operable for performing a method comprising:
receiving a print job;
processing the print job to build a first sheet mapping for rasterizing and printing the print job, and to store the first sheet mapping in memory;
processing the print job to extract one or more job properties;
applying the one or more job properties as input to estimator logic to determine an estimate time to load the first sheet mapping from the memory;
in response to determining that the estimate time for loading the first sheet mapping from the memory is shorter than a time threshold, loading the first sheet mapping from the memory, and providing the first sheet mapping for the rasterizing and the printing of the print job; and
in response to determining that the estimate time for loading the first sheet mapping from the memory is longer than a time threshold, initiating building a second sheet mapping for the print job, and providing the second sheet mapping in increments for the rasterizing and the printing of the print job as the building of the second sheet mapping is in progress.

15. The medium of claim 14 wherein the method further comprises:
in response to loading the first sheet mapping from the memory, determining a measured time of loading the first sheet mapping from the memory, and modifying a regression model of the estimator logic based on the measured time to refine accuracy of the estimator logic in estimating sheet mapping load times.

16. The medium of claim 15 wherein the method further comprises:
modifying the regression model using machine learning to adapt coefficients of the regression model based on previously printed print jobs.

17. The medium of claim 15 wherein:
coefficients of the regression model multiply the one or more job properties to determine the estimate time for loading the first sheet mapping from the memory.

18. The medium of claim 15 wherein:
the one or more job properties includes a number of pages in the print job, and
the regression model outputs the estimate time to load the first sheet mapping from the memory based on the number of pages in the print job.

19. The medium of claim 15 wherein:
the one or more job properties includes a number of records in the print job, and
the regression model outputs the estimate time to load the first sheet mapping from the memory based on the number of records in the print job.

20. The medium of claim 15 wherein:
the regression model includes a sum of a first coefficient multiplying a number of records in the print job and a second coefficient multiplying a number of pages in the print job.

* * * * *